ions of its length, where $ \frac{3}{2} $ represents the mean of $ \frac{3}{2} $.

United States Patent [19]
Dittrich et al.

[11] Patent Number: 5,995,913
[45] Date of Patent: Nov. 30, 1999

[54] METHOD OF STABILIZING THE HORIZON OF MAGNETIC COMPASSES

[75] Inventors: Frank Dittrich, Rebstein, Switzerland; Peter Nachbaur, Feldkirch, Austria; Silvio Gnepf, Heerbrugg, Switzerland

[73] Assignee: Leica Geosystems AG, Heerbrugg, Switzerland

[21] Appl. No.: 08/981,408

[22] PCT Filed: Aug. 21, 1996

[86] PCT No.: PCT/EP96/03681

§ 371 Date: Dec. 18, 1997

§ 102(e) Date: Dec. 18, 1997

[87] PCT Pub. No.: WO97/08513

PCT Pub. Date: Mar. 6, 1997

[30] Foreign Application Priority Data

Aug. 31, 1995 [DE] Germany .......................... 195 32 122

[51] Int. Cl.⁶ .................................................. G01C 17/38
[52] U.S. Cl. ................................. 702/92; 33/349; 33/359
[58] Field of Search ............................... 702/92, 93, 154; 33/361, 356, 349, 359; 324/247, 252

[56] References Cited

U.S. PATENT DOCUMENTS 5,701,259   12/1997   Dittrich ..................................... 702/92

*Primary Examiner*—Marc S. Hoff
*Assistant Examiner*—Hien Vo
*Attorney, Agent, or Firm*—Foley & Lardner

[57] ABSTRACT

Disclosed is a method of stabilizing the horizon of magnetic compasses. At measuring points measurements are taken of spatial components of the geomagnetic field vector and of an overall acceleration vector that is equal to the difference of the acceleration vector due to gravity and the acceleration vector of the magnetic compass. Taking into account the time rates of change of the measured components, the positional relation of the current horizon of the magnetic compass is determined relative to the stable horizon. Using quality functions that signal the deviation of the new spatial position relative to the one previously defined, an estimation method is used to evaluate the accuracy of the stabilized horizon of the system. A horizon can be produced that is largely unsusceptible to movement-induced accelerations of the device equipped with a magnetic compass.

5 Claims, No Drawings

METHOD OF STABILIZING THE HORIZON OF MAGNETIC COMPASSES

CROSS-REFERENCE TO RELATED APPLICATION

This application is the national stage application of PCT/EP96/03681, filed Aug. 21, 1996, which is entitled to priority of German Application No. 195 32 122.7, filed Aug. 31, 1995.

BACKGROUND OF THE INVENTION

1. Field of the Invention

The invention relates to a method of stabilizing the horizon of magnetic compasses.

2. Description of the Related Art

Customary compasses with a magnetic needle have no horizontal stabilization, but leveling is sometimes carried out, for example using a fluid support. The same effect would be achieved by suspending the compass from gimbles.

There are various known ways of stabilizing the horizon for magnetic compasses. For example, in the case of navigation systems, the horizon is stabilized using gyroscopic devices, but this is a complicated and expensive measure.

When there are faults in a system for stabilizing the horizon, a measuring error or reading error results, usually because of accelerations, when magnetic compasses of this type are used in motion, for example during a vehicle journey. The same errors may, however, also occur if the compass is only being held by hand.

In the case of a digital magnetic compass (DMC) known from DE 37 16 985 C1, the directional information is obtained from the projection of the geomagnetic field vector onto the horizontal plane. The DMC contains a separate sensor for each coordinate of the geomagnetic field. The horizontal plane is measured using two inclination sensors arranged perpendicular to one another. The inclination sensors are arranged in a common housing with the magnetic field sensors.

In actual fact, the inclination sensors are acceleration sensors. They are calibrated in the housing so that, in the stationary state, i.e. without additional acceleration forces acting, they only measure the components of the acceleration vector due to gravity in the X and Y directions of the DMC coordinate system, and determine therefrom the angle between the two said coordinate axes and the horizontal plane. The projection of the geomagnetic field vector is corrected in accordance with the current position of the DMC housing differing from the horizontal reference position.

The coordinate system of the DMC is a right-handed orthogonal cartesian coordinate system having origin O and three coordinate axes X, Y, Z. This coordinate system is regarded as fixed with respect to the DMC housing.

The X axis and the Y axis define a first plane which corresponds to the horizontal plane or reference plane when the DMC housing is aligned horizontally. The line of sight of the DMC coincides with the X axis. The Z axis is then parallel to the acceleration vector due to gravity.

If the DMC housing is inclined, then the DMC coordinate system must rotate with respect to a spatially fixed reference system which is likewise a right-handed orthogonal cartesian coordinate system having origin O, but now having three coordinate axes X', Y', Z'. In the horizontal state, the respectively corresponding coordinate axes and the origin of the two coordinate systems coincide.

After a rotation, the reference plane of the DMC would lie in a second plane which, for example, is obtained by one rotation through the angle $\alpha$ about the Y' axis and by one rotation through the angle $\beta$ about the X' axis. In the field of navigation, the angle $\alpha$ is referred to as the pitch angle, and the angle $\beta$ is referred to as the roll angle.

The XYZ coordinate system of the DMC can thus be converted into the spatially fixed X'Y'Z' coordinate system merely by a rotation. The pitch angle $\alpha$ and the roll angle $\beta$ are obtained as values measured by the inclination sensors.

Since the acceleration due to gravity varies only little over the surface of the earth, then, when the DMC is in a static state or in a state of uniform motion, particular inclination angles coincide everywhere with the actual position with respect to the acceleration vector due to gravity.

The behavior is different, however, if the DMC is built into a vehicle or an instrument which is braked, accelerated and moved on curved paths, so that radial accelerations and centrifugal accelerations occur.

As already mentioned, the inclination sensors are actually acceleration sensors. The latter contain a diaphragm which is deflected under the effect of acceleration forces. The deflection is measured as a variation in the capacitance of a capacitor. The deflections of the two inclination-sensor diaphragms measured in a vehicle therefore always represent a superposition of the inclination of the DMC with the acceleration vector due to gravity and the movement-induced accelerations of the DMC.

Under the assumption that the vehicle axis pointing in the direction of travel coincides with the X axis, accelerated movements on a horizontal surface lead to a pitch angle $\alpha$ being displayed, and therefore mimic an inclination of the horizontal plane. Under the same conditions, driving around a bend leads essentially to a deflection of the diaphragm of the roll angle sensor and therefore mimics a roll angle $\beta$. Centrifugal movements, cornering, cross-drift, etc. likewise cause the display of inclinations of the DMC plane with respect to the horizontal plane which do not actually exist, and therefore lead to the projection of the geomagnetic field vector onto an erroneous horizontal plane. Magnetic field sensors are not affected by accelerations. However, for geometrical reasons, the magnetic field vector is altered by a rotation of the DMC coordinate system XYZ with respect to the horizontally oriented, spatially fixed coordinate system X'Y'Z'. The time variation of the magnetic field vector is in this case proportional to the cross product of the magnetic field vector and the vector of the rate of rotation between the coordinate systems. The components of the rotation rate vector are the changes in the angles of rotation of the coordinate axes X, Y, Z per second with respect to the horizontally oriented coordinate axes X', Y', Z'. The rotation rate vector cannot be determined fully just from the magnetic field components since, for example, a rotation exactly about the magnetic field direction leaves all three magnetic field components unchanged, so that the component of the rotation rate vector parallel to the magnetic field cannot be determined. Although the inclination sensor actually measures the rotation rate directly, this rate is affected by error in the case of accelerated movements for the reasons mentioned above. If there is a rate of rotation, it therefore affects, on the one hand, the measurement of the magnetic field vector and, on the other hand, the determination of the correct horizontal plane.

DE 34 22 490 C2 discloses a method for correcting an angular error when determining the direction of travel of a vehicle. In order to determine a correction value, the components $H_X$ and $H_Y$ of the magnetic field in the plane of the vehicle are measured using two magnetic field sensors. An instrument for measuring the inclination angle determines the inclination angle in the direction of the longitudinal axis of the vehicle. Effects of acceleration on the inclination angle are in this case taken into account by determining the first derivative of the velocity of the vehicle. The correction to the direction of travel takes into account only the error caused by the vehicle being inclined at an angle in its longitudinal direction with respect to the horizontal.

U.S. Pat. Nos. 5,287,628 and 5,444,916 disclose devices which each have three mutually orthogonal magnetic field sensors and inclination sensors, using which a horizontal plane can be generated electronically. The inclination of a vehicle is determined with respect to this horizontal plane. Acceleration effects are not taken into account.

EP 0 668 485 A1 discloses a method for reconstructing the yaw angle of a vehicle, measured using a magnetic field sensor, from raw data affected by error. For calculation, use is made of a valuation function, an iterative method, a selectable membership function and values established on the basis of a plausibility consideration. The method is based on the premise that, although directionally dependent spurious effects in the measurement of the yaw angle can indeed be registered through data measured by other sensors, they cannot be compensated by combination therewith.

SUMMARY OF THE INVENTION

The object of the invention is therefore to provide a method for stabilizing the horizon of digital magnetic compasses, in which the effect of acceleration-dependent contributions in the measurement of the rotation rate is minimized.

The invention is based on the idea of using an estimate of the rotation rate vectors during a change of the pitch and roll angles to provide a criterion as to whether or not this change is appropriate on the basis of the measured, purely geometrical rotations of the magnetic field vector. Thus, in the ideal case, with full knowledge of the rotation rate vector, only variations in the reference system which correspond to the known rotation rate vector would be allowed, i.e. taken into account in the projection of the magnetic field vector. All acceleration-dependent contributions are filtered out.

DESCRIPTION OF SPECIFIC EMBODIMENTS

The subject matter of the invention will be explained in more detail below with reference to an illustrative embodiment with the procedural steps according to the invention.

Step a)

At times $t_{j-1}$ and $t_j$, with $j=1, 2, \ldots, n$, the components $H_X$, $H_Y$ and $H_Z$ of the field vector H of the geomagnetic field in the XYZ coordinate system are measured.

Also at times $t_{j-1}$ and $t_j$, measurements are taken of the components $g_X$ and $g_Y$ of the overall acceleration vector $g_{TOT}$, which is composed of the acceleration vector due to gravity $g_{EARTH}$ and the vehicle/compass acceleration vector a, i.e. $g_{TOT} = g_{EARTH} - a$. The acceleration vector due to gravity starts from the origin of the XYZ coordinate system. If the magnetic compass is horizontally aligned, then the acceleration vector due to gravity, which points in the direction of the center of the earth, and the Z axis coincide.

Use is advantageously made of the overall acceleration vector, normalized to 1, $g = (g_X, g_Y, g_Z) = g_{TOT}/|g_{TOT}|$, with $|g_{TOT}| = (g^2_{TOT\,X} + g^2_{TOT\,y} + g^2_{TOT\,z})^{1/2}$.

Since, if the magnetic compass is fitted in a vehicle, the vehicle generally moves during the measurements, the measurements at times $t_{j-1}$ and $t_j$ are taken at spatially different measuring points. Nevertheless, the undistorted geomagnetic field, i.e. not affected by, for example, large iron masses such as bridges, may be regarded as homogeneous over the distances which are covered by a terrestrial vehicle between two measurements. However, if distortions arise, then it is preferable to take corresponding measures (cf. DE 44 39 945 C1), not yet published at the filing date of the present application).

Information regarding the position of the reference plane of the compass or changes thereto can be derived from the acceleration vector g due to gravity.

Step b)

The time variations of the components $g_X$ and $g_Y$ of the overall acceleration vector $g_{TOT}$ are determined. A large value for a time variation of one component of the overall acceleration vector $g_{TOT}$ would, in the case of a magnetic compass in a vehicle, indicate a sudden change in the velocity of the vehicle in the direction of this component as, for example, may occur during hard braking.

Step c)

The derivative of the magnetic field vector H with respect to time is determined, i.e. the time variation of the components $H_X$, $H_Y$, $H_Z$ of the magnetic field vector H and its absolute value $|H|$ are determined. A large variation in the value of one magnetic field vector component would indicate a sudden change in the direction of the alignment of the magnetic compass or of the vehicle.

Since, as already mentioned above in Step a), the vehicle is generally in motion, the differentiation does not take place at a unique measuring point and, here again, homogeneity of the geomagnetic field between the measuring points is assumed.

Steps b) and c) may also be carried out simultaneously.

Step d)

The rotation rate components of the vector field are determined from the values calculated in steps a), b) and c), by means of which components the relationship between the spatial position of the magnetic compass when aligned horizontally and the currently tilted magnetic compass is defined at a particular point.

In principle, these rotation rate components are the sin and cos values of the angles which determine the positional relationship between the coordinate axes of the two cartesian coordinate systems which have a common origin but are rotated relative to one another.

Step e)

A pitch term is determined from the Y meridian component of the calculated rotation rate components. The Y meridian component runs parallel to the line of sight of the magnetic compass.

Step f)

A roll term is determined from the X meridian component of the calculated rotation rate components. The X meridian component runs perpendicular to the line of sight of the magnetic compass.

Step g)

Under the assumption that the rotations predominantly take place individually about the Y (pitch angle variation) and X (roll angle variation) axes, an approximate quality function for the variation of the horizon is determined. In this test, a first quality function for the measured horizon is established on the basis of the values determined in Step c), i.e. from the time variation of the magnetic field vector H, and a second quality function for the stabilized horizon is established on the basis of the values determined in Steps e) and f).

Step h

On the basis of the first and second quality functions, an estimation method is carried out, by means of which the accuracy of the true (i.e. stabilized) horizon of the system is evaluated.

Step i)

Using the estimation method, the measured and/or estimated values of the inclination sensors are weighted. This leads to the production of a stabilized horizon that is substantially unsusceptible to movement-induced accelerations but is nevertheless sensitive to positional variations of the system.

An example of how the invention may be put into practice will be specified below while giving the mathematical relationships.

a) At discrete instants $t_j$, j=1, 2, ..., n, the components of the geomagnetic field vector H and the components $g_X$ and $g_Y$ of the overall acceleration vector, normalized to 1, $g=g_{TOT}/|G_{TOT}|$ are measured, with $g_{TOT}=g_{EARTH}-a$ and a being the vehicle acceleration vector. $g_{Xj}$ and $g_{Yj}$ as well as $H_{Xj}$ and $H_{Yj}$ and $H_{Zj}$ are thereby obtained. The length of $g_j$ is $g_j=(g^2_{Xj}+g^2_{Yj}+g^2_{Zj})^{1/2}=1$ The components of $g_{EARTH}/|g_{EARTH}|$ can be expressed using the pitch angle $\alpha$ and the roll angle $\beta$:

$$\frac{g_{EARTH}}{|g_{EARTH}|} = \begin{pmatrix} -\sin(\alpha) \\ \cos(\alpha)\cdot\sin(\beta) \\ \cos(\alpha)\cdot\cos(\beta) \end{pmatrix}$$

b) The time variation of the components $g_X$ and $g_Y$ of the overall acceleration vector g are determined as the difference between the values at times j and j−1.

c) The following equation describes the time variation of a vector, here taken as the geomagnetic field vector H, which is subjected to a rotation with instantaneous angular velocity $\omega$:

$$dH/dt = \dot{H} = \omega \times H$$

d) If, in the coordinate system XYZ, a rotation about the Y axis alone is assumed, then the components of H at times j and j−1, i.e. $H_j$ and $H_{j-1}$, in the X-Z plane are to be taken into account, that is to say $H_{Xj}$, $H_{Zj}$, $H_{Xj-1}$ and $H_{Zj-1}$, and the following formula for the rotation rate about the Y axis is obtained:

$$\omega_{Yj} \cdot \Delta t = \frac{H_{Zj-1}\cdot H_{Xj} - H_{Xj-1}\cdot H_{Zj}}{(H^{av}_{Xj})^2 + (H^{av}_{Zj})^2}$$

with the averages $H_{Xj}^{av}$ and $H_{Zj}^{av}$ according to $$H_{Xj}^{av}=(H_{Xj-1}+H_{Xj})/2 \text{ and } H_{Zj}^{av}=(H_{Zj-1}+H_{Zj})/2$$

e) If a rotation about the X axis alone is assumed, then, in similar fashion to the above rotation about the Y axis, the following formula for the rotation rate about the X axis results:

$$\omega_{Xj} \cdot \Delta t = \frac{H_{Yj-1}\cdot H_{Zj} - H_{Zj-1}\cdot H_{Yj}}{(H^{av}_{Yj})^2 + (H^{av}_{Zj})^2}$$

with the averages $H_{Yj}^{av}$ and $H_{Zj}^{av}$ according to $$H_{Yj}^{av}=(H_{Yj-1}+H_{Yj})/2 \text{ and } H_{Zj}^{av}=(H_{Zj-1}+H_{Zj})/2$$

f) Quality functions for the variation in the measured horizon on the basis of the time variation of the components of the overall acceleration vector g are then determined. The following may be used for this:

$$Q_{Xj}^g = f\cdot(g_{Xj}-g_{Xj-1})^2 \text{ and } Q_{Yj}^g = f\cdot(g_{Yj}-g_{Yj-1})^2$$

The factor f is used to optimize the method. In practice, f=5 has been found to be the most favorable value.

g) The measured rotation angles of the magnetic field vector H are used as quality functions for allowed variations in the measured horizon:

$$Q_{Xj}^H=(\omega_{Yj}\cdot\Delta t)^2 \quad Q_{Yj}^H=(\omega_{Xj}\cdot\Delta t)^2$$

h) Weighting factors $G_{Xj}$ for $g_X$, and $G_{Yj}$ for $g_Y$, are given as functions of the quality functions according to:

$$G_{Xj} = \frac{Q_{Xj}^H}{Q_{Xj}^H + Q_{Xj}^g} \quad \text{and} \quad G_{Yj} = \frac{Q_{Yj}^H}{Q_{Yj}^H + Q_{Yj}^g}$$

i) The stabilized quantities are then given using the weighting factors from the equation $$g_{Xj}^{stab}=g_{Xj-1}^{stab}+G_{Xj}\cdot(g_{Xj}-g_{Xj-1}^{stab}) \quad g_{Yj}^{stab}=g_{Yj-1}^{stab}+G_{Yj}\cdot(g_{Yj}-g_{Yj-1}^{stab}).$$

The quality function obviously becomes zero if the rotation angle component becomes zero. This is the case if the corresponding magnetic field component at time j is equal to the component at time j−1, i.e. for purely linear accelerations. Moreover, the weighting factor then also becomes zero and the stabilized g component at time j becomes equal to the stabilized g component at time j−1.

In accordance with the described method, the stabilized values specified above can be used, after a suitable conversion, to be fed as input values to a control device or a display device.

Said input signals may also be fed to a control device which is not used for a display device but, for example, for controlling a mechanical quantity.

It has been pointed out that it is not possible to obtain the entire rotation matrix from only two measurements of the magnetic field vector. Interference can for this reason occur between the individual rotation directions. Nevertheless, in the case of a linear acceleration, distortion can be almost fully eliminated since, in this case, there is no rotation and therefore also no interference between the various rotation directions.

Even in the event that rotations occur, with the above-mentioned assumptions, a correct estimate will, on average, be obtained more frequently than an incorrect one, so that the final results will be improved in the case of navigation calculations. These considerations were confirmed in practice by test runs of vehicles equipped with magnetic compasses of the relevant type, it having been possible to achieve an improvement of more than a factor of 2 in the navigation results.

The method indicated above can be supplemented by introducing an additional genuine gyroscope. However, this would make the compass more expensive. Two gyro compasses with non-parallel axes would be required, so as never to enter the singular situation of the available gyroscope axes coinciding with the Earth's field direction.

The described method could be developed further by the use of Kalman filter forms.

It will further be pointed out that a quality function can be calculated in a variety of ways, including 1) using Kalman filters;
2) using maximum likelihood operators;
3) fitting an empirically determined distribution;
4) using neural networks;
5) using fuzzy logic;
6) using rule-based systems;
7) using other expert systems.

ANNEX

Derivation of the transformation equations under approximation of the rotation rate components.

The case of pure rotation about the Y axis will be considered, i.e. purely variation of the pitch angle α.

In the XZ plane, it will be assumed that, at an instant $t_{j-1}$, the magnetic field vector component is $H_{j-1}=(H_{Zj-1}, H_{Xj-1})$ and, at a later instant $t_j$, there is the rotated component $H_j=(H_{Zj}, H_{Xj})$.

The following equation describes the time variation of a vector H which is subjected to a rotation with instantaneous angular velocity ω:

$$dH/dt = \dot{H} = \omega \times H$$

If it is then assumed that ω only has a Y component $\omega_Y$, then the above equation gives:

$$\dot{H}_X = \omega_Y \cdot H_Z \quad \dot{H}_Z = -\omega_Y \cdot H_X$$

Multiplication by $H_Z$ and $H_X$, followed by subtraction gives:

$$\omega_Y = \frac{H_Z \cdot \dot{H}_X - H_X \cdot \dot{H}_Z}{H_X^2 + H_Z^2}$$

The following are correspondingly found for $\omega_X$ $$\dot{H}_Y = -\omega_X \cdot H_Z$$
$$\dot{H}_Z = \omega_X \cdot H_Y$$
$$\omega_X = \frac{H_Y \cdot \dot{H}_Z - H_Z \cdot \dot{H}_Y}{H_Y^2 + H_Z^2}$$

In principle, it can be shown that these formulae are statistically optimal in terms of least squares.

For discrete vectors which are separated by the time interval $\Delta t = t_j - t_{j-1}$, these equations need to be adapted accordingly.

One possible discretization scheme might use the averages $$H_{Xj}^{av} = (H_{Xj} + H_{Xj-1})/2$$
$$H_{Yj}^{av} = (H_{Yj} + H_{Yj-1})/2$$
$$H_{Zj}^{av} = (H_{Zj} + H_{Zj-1})/2$$

$$\omega_{Yj} \cdot \Delta t = \frac{H_{Zj}^{av} \cdot (H_{Xj} - H_{Xj-1}) - H_{Xj}^{av} \cdot (H_{Zj} + H_{Zj-1})}{(H_{Xj}^{av})^2 + (H_{Zj}^{av})^2}$$

$$= \frac{H_{Zj-1} \cdot H_{Xj} - H_{Xj-1} \cdot H_{Zj}}{(H_{Xj}^{av})^2 + (H_{Zj}^{av})^2}$$

$$\omega_{Xj} \cdot \Delta t = \frac{H_{Yj}^{av} \cdot (H_{Zj} - H_{Zj-1}) - H_{Zj}^{av} \cdot (H_{Yj} + H_{Yj-1})}{(H_{Yj}^{av})^2 + (H_{Zj}^{av})^2}$$

$$= \frac{H_{Yj-1} \cdot H_{Zj} - H_{Zj-1} \cdot H_{Yj}}{(H_{Yj}^{av})^2 + (H_{Zj}^{av})^2}$$

In this case, $\omega_{Yj} \cdot \Delta t$ and $\omega_{Xj} \cdot \Delta t$ denote the calculated rotation angles between instants $t_{j-1}$ and $t_j$, with $\Delta t = t_j - t_{j-1}$.

We claim:

1. Method of stabilizing a horizon of a magnetic compass, the method comprising:
   a) measuring in a cartesian coordinate system having axes X, Y and Z, at times $t_{j-1}$ and $t_j$, with j=1, 2, ..., n, components $H_X$, $H_Y$ and $H_Z$ of a magnetic field vector H of a geomagnetic field and components $g_X$ and $g_Y$ of a vector $g_{TOT}$ of an overall acceleration $g_{TOT}$, which is composed of an acceleration vector due to gravity and a vehicle/compass acceleration vector, with the acceleration vector due to gravity starting from an origin of the cartesian coordinate system and coinciding with the Z axis when the magnetic compass is horizontally aligned, and with the X axis forming a line of sight;
   b) determining time variations of the components $g_X$ and $g_Y$ of the overall acceleration vector $g_{TOT}$;
   c) determining time variations of the components $H_X$, $H_Y$, $H_Z$ of the magnetic field vector H;
   d) determining rotation rate components of a vector field from values calculated in a), b) and c), by means of which components a relationship between a spatial position of the magnetic compass when aligned horizontally and a currently tilted magnetic compass is defined at a particular point;
   e) determining a pitch term from a Y meridian component of the determined rotation rate components;
   f) determining a roll term from an X meridian component of the determined rotation rate components;
   g) determining an appropriate quality function for a variation of the horizon under an assumption that rotations predominantly take place individually as pitch angle variation about the Y axis and as roll angle variation about the X axis, by
   $g_1$) determining a first quality function for a measured horizon based on values determined in c), and
   $g_2$) determining a second quality function for a stabilized horizon based on values determined in e) and f), and
   h) carrying out an estimation method based on the first and second quality functions, by means of which an accuracy of the stabilized horizon is evaluated; and
   i) weighting measured or estimated values of inclination sensors using the estimation method, which produces a stabilized horizon that is substantially unsusceptible to movement-induced accelerations but is nevertheless sensitive to positional variations.

2. Method of stabilizing a horizon of a magnetic compass the method comprising:
   a) measuring in a cartesian coordinate system having axes X, Y and Z, at times $t_{j-1}$ and $t_j$, with j=1, ..., n, components $H_X$, $H_Y$ and $H_Z$ of a magnetic field vector H of a geomagnetic field and components $g_X$ and $g_Y$ of a vector, normalized to 1, $g = g_{TOT}/|g_{TOT}|$ of an overall acceleration $g_{TOT}$, which is composed of an acceleration vector $g_{earth}$ due to gravity and a vehicle/compass acceleration vector a, with the acceleration vector due to gravity starting from an origin of the cartesian coordinate system and coinciding with the Z axis when the magnetic compass is horizontally aligned, and with the X axis forming a line of sight, so that values $g_X$ and $g_{Yj}$ and $H_{Xj}$, $H_{Yj}$ and $H_{Zj}$ are obtained, and components of g are expressed using pitch angle $\alpha$ and roll angle $\beta$ as:

$$\frac{g_{EARTH}}{|g_{EARTH}|} = \begin{pmatrix} -\sin(\alpha) \\ \cos(\alpha)\sin(\beta) \\ \cos(\alpha)\cos(\beta) \end{pmatrix};$$

b) determining time variations of the components $g_X$ and $g_Y$ of a normalized overall acceleration vector $g_{TOT}$;

c) determining time variations of components $H_X$, $H_Y$, $H_Z$ of the magnetic field vector H, and its absolute value $|H|$;

d) determining rotation rate $\omega_{Yj} \cdot \Delta t$ about the Y axis wherein in the cartesian coordinate system, a rotation about the Y axis alone is assumed, and taking into account the components of H at times j and j−1, $H_j$ and $H_{j}$, in an X-Z plane, $H_{Xj}$, $H_{Zj}$, $H_{Xj-1}$ and $H_{Zj-1}$, as follows:

$$\omega_{Yj} \cdot \Delta t = \frac{H_{Zj-1} \cdot H_{Xj} - H_{Xj-1} \cdot H_{Zj}}{(H_{Xj}^{av})^2 + (H_{Zj}^{av})^2}$$

with averages $H_{Xj}^{av}$ and $H_{Zj}^{av}$ according to $$H_{Xj}^{av} = (H_{Xj-1} + H_{Xj})/2 \text{ and } H_{Zj}^{av} = (H_{Zj-1} + H_{Zj})/2$$

e) determining rotation rate $\omega_{Xj} \cdot \Delta t$ about the X axis, wherein in the cartesian coordinate system, a rotation about the X axis alone is assumed, and taking into account components of H at times j and j−1, $H_j$ and $H_{j-1}$, in a Y-Z plane, $H_{Zj}$, $H_{Yj}$, $H_{Zj-1}$ and $H_{Yj-1}$, as follows:

$$\omega_{Xj} \cdot \Delta t = \frac{H_{Yj-1} \cdot H_{Zj} - H_{Zj-1} \cdot H_{Yj}}{(H_{Yj}^{av})^2 + (H_{Zj}^{av})^2}$$

with averages $H_{Yj}^{av}$ and $H_{Zj}^{av}$ according to $$H_{Yj}^{av} = (H_{Yj-1} + H_{Yj})/2 \text{ and } H_{Zj}^{av} = (H_{Zj-1} + H_{Zj})/2$$

f) determining quality functions for variation of a measured horizon based on time variation of components of the overall normalized acceleration vector g according to:

$$Q_{Xj}^g = f \cdot (g_{Xj} - g_{Xj-1})^2 \text{ and } Q_{Yj}^g = f \cdot (g_{Yj} - g_{Yj-1})^2$$

with a numerical factor f;

g) determining quality functions for allowed variations of a measured horizon by using a rotation angle of the magnetic field vector H according to:

$$Q_{Xj}^H = (\omega_{Yj} \cdot \Delta t)^2 \text{ and } Q_{Yj}^H = (\omega_{Xj} \cdot \Delta t)^2;$$

h) determining weighting factors $G_{Xj}$ for $g_X$, and $G_{Yj}$ for $g_Y$, as functions of the quality functions determined in f) and g) according to:

$$G_{Xj} = \frac{Q_{Xj}^H}{Q_{Xj}^H + Q_{Xj}^g} \quad \text{and} \quad G_{Yj} = \frac{Q_{Yj}^H}{Q_{Yj}^H + Q_{Yj}^g}$$

i) determining stabilized values using the weighting factors according to $$g_{Xj}^{stab} = g_{Xj-1}^{stab} + G_{Xj} \cdot (g_{Xj} - g_{Xj-1}^{stab}) \quad g_{Yj}^{stab} = g_{Yj-1}^{stab} + G_{Yj} \cdot (g_{Yj} - g_{Yj-1}^{stab}).$$

3. Method according to claim 1, further comprising:
using normalized components of the measured overall acceleration vector, which satisfy an equation $g_X^2 + g_Y^2 + g_Z^2 = 1$.

4. Method according to claim 1, wherein the factor f has a value of between 3 and 8.

5. Method according to claim 1, wherein the factor f has a value of between 5 and 6.

* * * * *